United States Patent [19]
Bang et al.

[11] Patent Number: 6,090,206
[45] Date of Patent: Jul. 18, 2000

[54] THROTTLE VALVE PROVIDING ENHANCED CLEANING

[75] Inventors: Won B. Bang, San Jose, Calif.;
Matthew W. Losey, Cambridge, Mass.;
Francimar Campana, Milpitas, Calif.;
Srinivas Nemani, San Jose, Calif.;
Sundar Pichai, Santa Clara, Calif.

[73] Assignee: Applied Materials, Inc., Santa Clara, Calif.

[21] Appl. No.: 08/954,299

[22] Filed: Oct. 20, 1997

[51] Int. Cl.[7] ............................... C23C 16/00; F16K 5/10
[52] U.S. Cl. ...................... 118/715; 251/309; 364/468.28
[58] Field of Search ............................ 118/715; 251/309; 364/468.28

[56] References Cited

U.S. PATENT DOCUMENTS

| | | | |
|---|---|---|---|
| 1,290 | 8/1839 | Kellogg et al. | 251/309 |
| 3,092,365 | 6/1963 | Knappe | 251/309 |
| 3,093,358 | 6/1963 | Wakeman | 251/309 |
| 3,233,865 | 2/1966 | Panzica et al. | 251/309 |
| 3,254,872 | 6/1966 | Roos | 251/163 |
| 3,314,643 | 4/1967 | Sachnik | 251/309 |
| 3,799,499 | 3/1974 | Shur | 251/290 |
| 4,146,055 | 3/1979 | Ryder et al. | 137/625.41 |
| 4,657,222 | 4/1987 | Tullio | 251/56 |
| 4,697,786 | 10/1987 | Kennedy | 251/309 |
| 5,000,113 | 3/1991 | Wang et al. | 118/723 E |
| 5,156,186 | 10/1992 | Manska | 137/556 |
| 5,467,796 | 11/1995 | Pettinaroli et al. | 137/238 |
| 5,558,717 | 9/1996 | Zhao et al. | 118/715 |
| 5,560,392 | 10/1996 | Spang et al. | 137/552 |
| 5,601,651 | 2/1997 | Watabe | 118/715 |
| 5,648,175 | 7/1997 | Russell et al. | 428/472.3 |
| 5,685,912 | 11/1997 | Nishizaka | 118/719 |
| 5,799,695 | 9/1998 | Bey | 137/625.32 |
| 5,812,403 | 9/1998 | Fong et al. | 364/468.28 |
| 5,871,813 | 2/1999 | Pham | 427/248.1 |
| 5,873,942 | 2/1999 | Park et al. | 118/719 |

FOREIGN PATENT DOCUMENTS

| | | |
|---|---|---|
| 1 520 629 | 7/1968 | France . |
| 1 894 519 | 6/1964 | Germany . |
| 14 50 657 | 5/1969 | Germany . |
| 22 04 316 | 8/1973 | Germany . |

*Primary Examiner*—Jeffrie R. Lund
*Attorney, Agent, or Firm*—Howrey, Simon Arnold & White

[57] ABSTRACT

A throttle valve assembly is provided, including a throttle valve housing having a bore therethrough and a throttle valve plug assembly. The throttle valve plug assembly includes a shaft rotatably mounted on the throttle valve housing and a throttle valve plug having a concave cut-out portion. The throttle valve plug is mounted on the shaft within the throttle valve housing and substantially perpendicular to the bore. The throttle valve plug has at least two fully open positions and a closed position.

7 Claims, 7 Drawing Sheets

THROTTLE VALVE PROVIDING ENHANCED CLEANING

BACKGROUND OF THE INVENTION

1. Field of the Invention

This invention relates generally to vacuum processing chambers which are widely used in the semiconductor industry, and in particular to chemical vapor deposition (CVD) processing chambers.

2. Description of the Related Art

The process of depositing layers on a semiconductor wafer (or substrate) usually involves heating the substrate and holding it a short distance from the source of a stream of deposition (or process) gas flowing towards the substrate. The flowing gas reacts and deposits a layer on the heated substrate.

A non-uniform gas flow pattern causes undesirable variations in the uniformity of the coating layer deposited across the surface of the wafer. Typically the exhaust port opening extending from the process chamber to the vacuum pump leads to asymmetry in the gas flow pattern. In an attempt to restore symmetry many designs provide a pumping channel which surrounds the wafer. However, in many configurations, symmetry is not possible because complete encirclement of the wafer is not possible due to interfering structures, e.g., the wafer insertion opening through which a robot arm passes the wafer into the chamber. Such chambers having mechanical asymmetry cannot achieve as high a gas flow symmetry as would be desired on the wafer.

The configuration of the channel and its lack of symmetry about the center of the wafer being processed affect the location at which the orifices can be placed and constrain the design based on the need to avoid other structures and passages in the chamber, e.g., the wafer insertion and removal opening and its path into and out of the chamber. In many instances the orifices to the pumping channel are configured in the chamber at locations which provide a less than ideal gas flow regime from the gas distribution plate to the pumping channel. Greater deposition takes place where the greatest number of reactants contact the substrate surface, i.e., around the vacuum apertures. The process gas flow resulting from such a configuration includes small but measurable variations in the thickness of the material deposited on the wafer.

At some point in the vacuum line between the chamber and the vacuum pump, a vacuum shut-off or throttle valve typically is provided which when closed acts as a limit of the process chamber containment. Volatile contaminants which are maintained in their vapor state under the high temperatures of an active processing chamber can and do undesirably condense on the walls of the cool vacuum piping at some distance from the processing area of the processing chamber, but still within the containment limit of the processing chamber defined by the vacuum valve. During no-flow conditions, these contaminants can migrate back into the processing part of the chamber to undesirably contribute to its contamination. In an attempt to avoid this problem, the inside surfaces within the containment limit of the processing chamber are periodically cleaned by etching (and/or plasma cleaning) these surfaces with a cleaning gas to remove the dielectric material deposited by the deposition gas. Optimization involves extending the time between cleanings as much as possible without introducing defects. Cleaning interferes with normal production processing.

The present invention is directed to overcoming, or at least reducing the effects of, one or more of the problems set forth above.

SUMMARY OF INVENTION

In one aspect of the present invention, a throttle valve assembly is provided, including a throttle valve housing having a bore therethrough and a throttle valve plug assembly. The throttle valve plug assembly includes a shaft rotatably mounted on the throttle valve housing and a throttle valve plug having a concave cut-out portion. The throttle valve plug is mounted on the shaft within the throttle valve housing and substantially perpendicular to the bore. The throttle valve plug has at least two fully open positions and a closed position.

In another aspect of the present invention, a chemical vapor deposition reactor system is provided having such a throttle valve assembly. In yet another aspect of the present invention, a method of cleaning such a throttle valve assembly is provided. In still another aspect of the present invention, a method of chemical vapor deposition using such a throttle valve assembly is provided.

BRIEF DESCRIPTION OF THE DRAWINGS

Other objects and advantages of the invention will become apparent upon reading the following detailed description and upon reference to the drawings in which.

Figure 1:
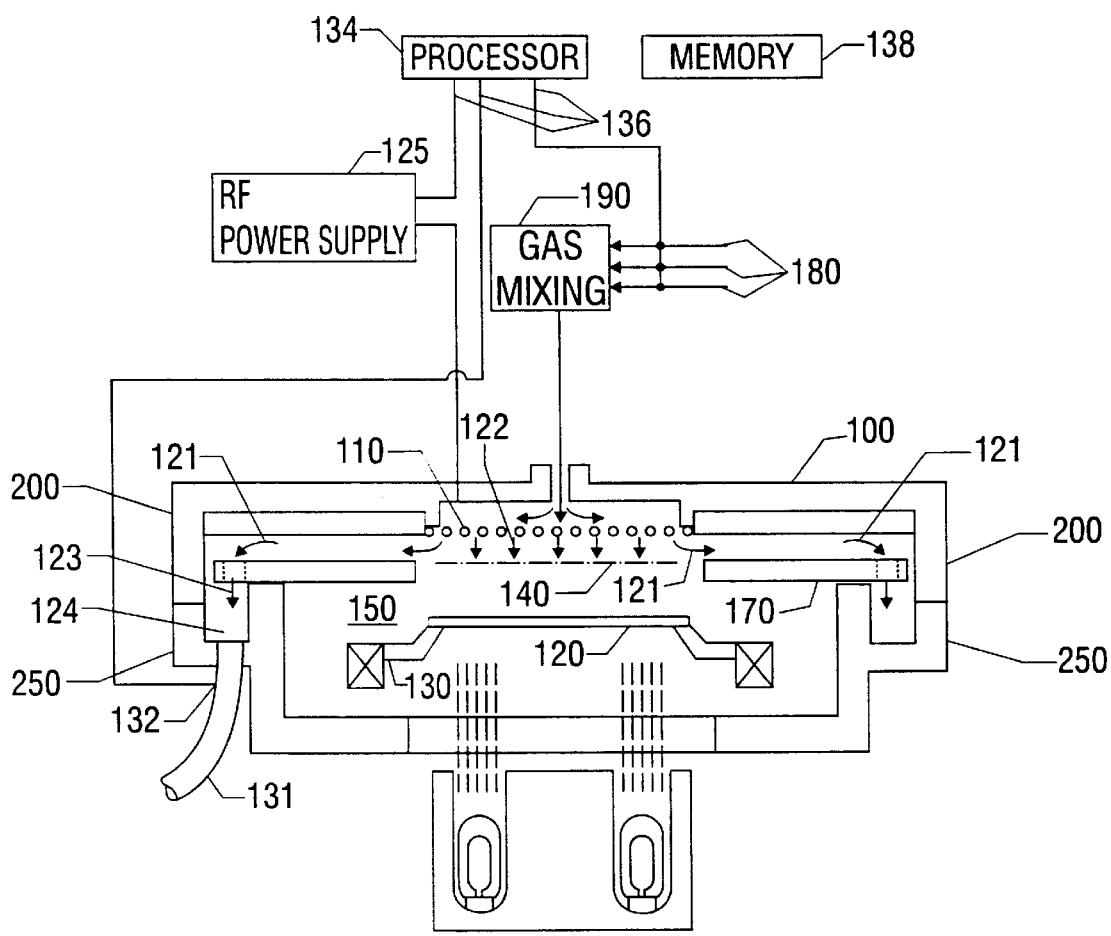
FIG. 1 is a vertical, cross-sectional view of a simplified, parallel plate chemical vapor deposition reactor that may be used with embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular to FIG. 1, an exemplary CVD reactor system is shown. Such a CVD reactor system may be suitable for depositing a germanium-doped boron phosphorus silicate glass (BPSG) layer, for example. Such a layer may be formed in a variety of different CVD processing machines. One such suitable CVD machine is shown in FIG. 1, which is a vertical, cross-sectional view of a simplified, parallel plate chemical vapor deposition system 100 having a vacuum chamber 150. The CVD system 100 contains a gas inlet manifold 110 for dispersing deposition gases to a wafer (not shown) that rests on a susceptor 120. Susceptor 120 is highly thermally responsive and is mounted on support fingers 130 so that susceptor 120 (and the wafer supported on the upper surface of susceptor 120) can be controllably moved between a lower loading/off-loading position and an upper processing position 140 which is closely adjacent manifold 110.

Figure 2:
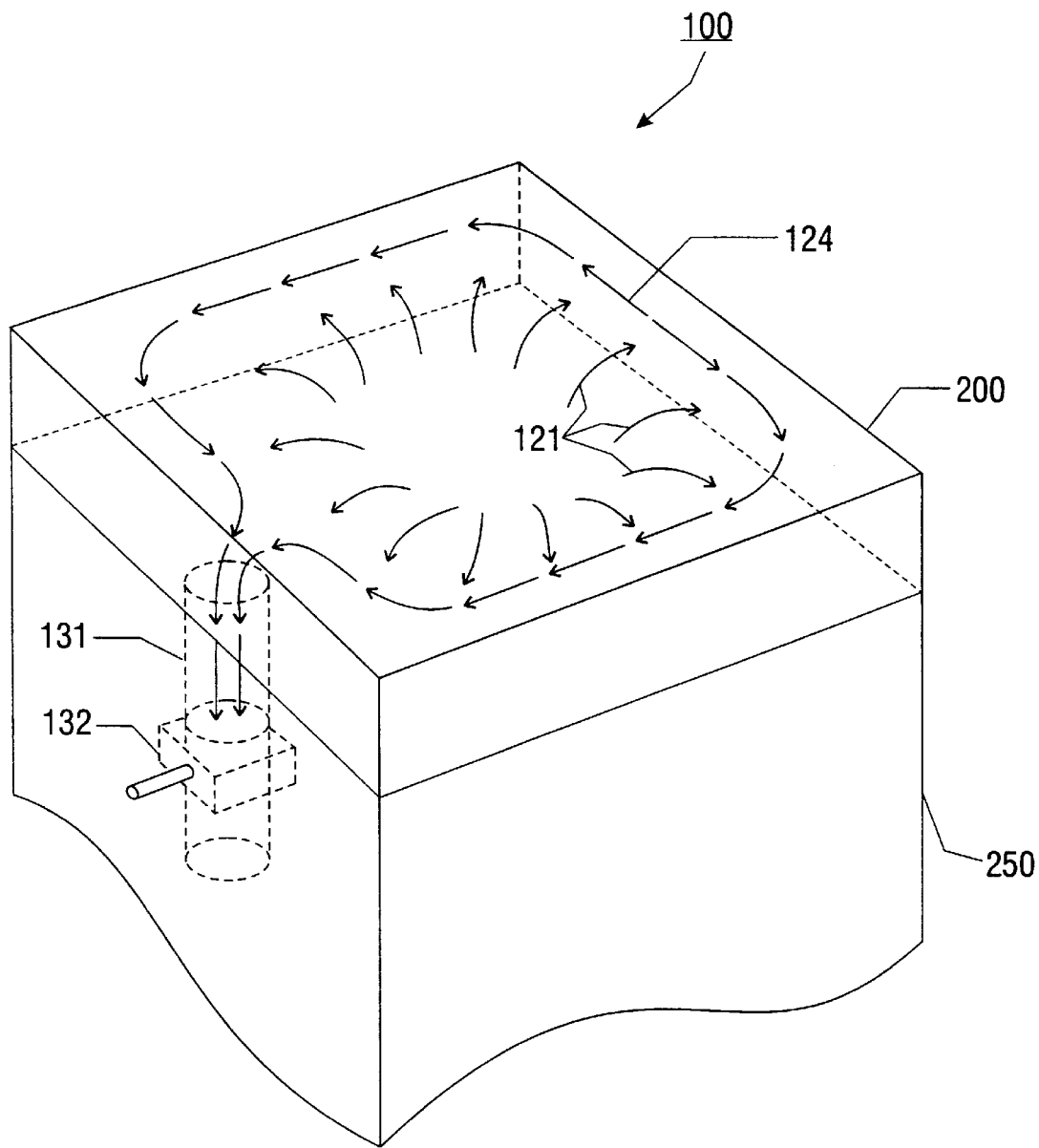
FIG. 2 is a schematic perspective view showing exemplary gas flows in the reactor of FIG. 1 and showing an embodiment of the present invention.

When susceptor 120 and the wafer are in processing position 140, they are surrounded by a baffle plate 170 having a plurality of spaced holes 123 which exhaust into an annular vacuum manifold or pumping channel 124 (as indicated schematically in FIG. 2). The pumping channel 124 may be formed at the junction of the lid 200 of the CVD system 100 with the walls 250 of the vacuum chamber 150 (FIG. 1), as indicated schematically also in FIG. 2. Deposition and carrier gases are supplied through gas lines 180 into a mixing chamber 190 where they are combined and then sent to manifold 110. During processing, gas supplied to manifold 110 is uniformly distributed across the surface of the wafer as indicated by arrows 122. The gas is then exhausted via ports 123 into the circular vacuum manifold or pumping channel 124, as indicated by arrows 121, and out an exhaust line 131, as shown in FIG. 2, by a vacuum pump system (not shown). The rate at which gases are released through exhaust line 131 is controlled by a throttle valve 132, also shown schematically, in phantom, in FIG. 2.

Figure 3:
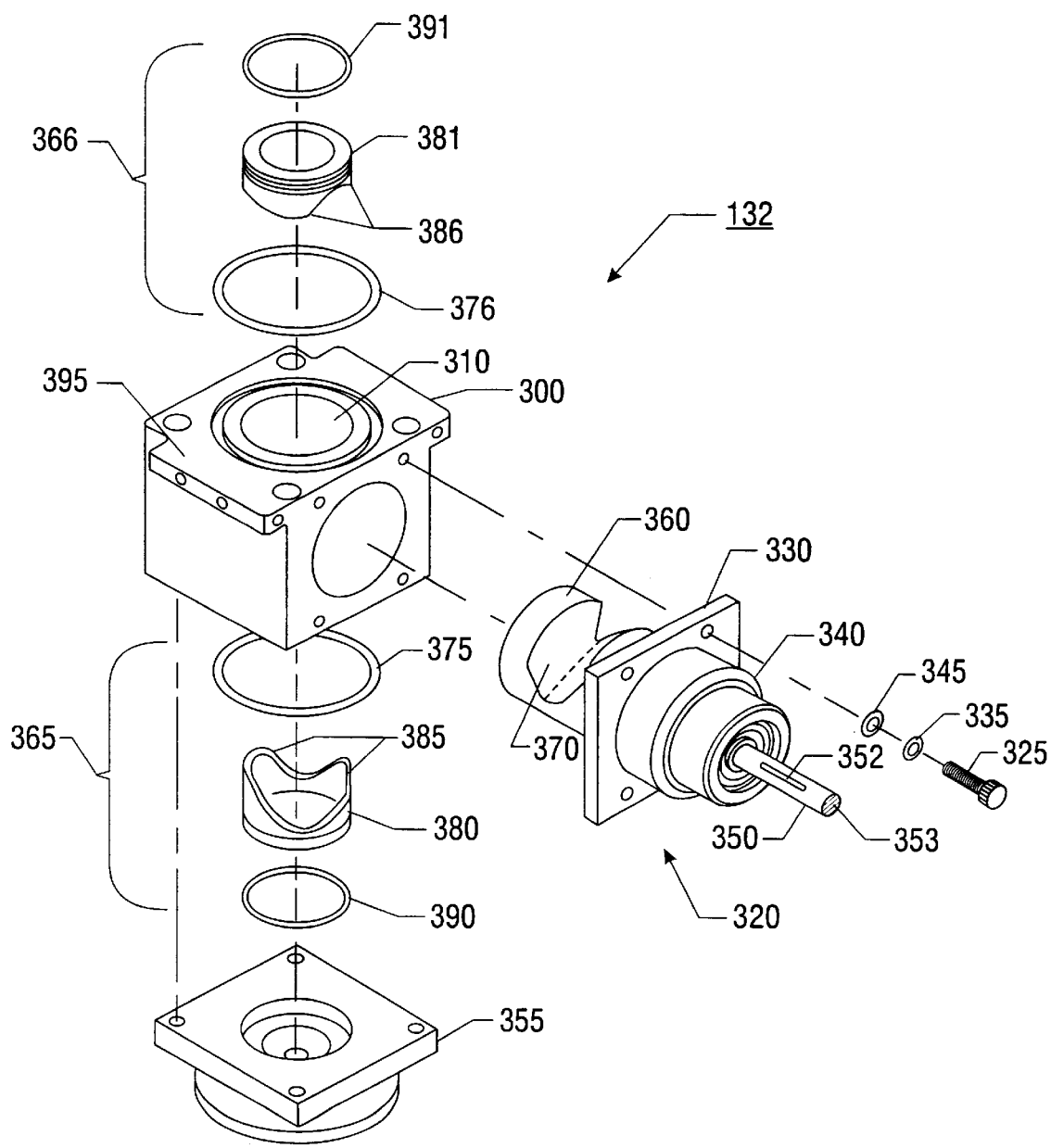
FIG. 3 is an exploded view of an embodiment of the present invention.

Turning now to FIG. 3, showing an exploded view of a throttle valve or throttle valve assembly 132 according to an embodiment of the present invention, a throttle valve housing 300 is shown having a generally cylindrical bore 310 therethrough. A throttle valve plug assembly 320 is shown in FIG. 3, having a face plate 330, with a plug housing 340 mounted on the face plate 330, and a shaft 350 rotatably mounted on the plug housing 340 and extending and passing through the face plate 330. The shaft 350 may have one or more flat portions 352 along the shaft 350, and a slot 353 at the end of the shaft 350, so that tools to turn and position the shaft 350 may engage the shaft 350 more securely. A throttle valve plug 360 having a generally concave cut-out portion 370 may be mounted on the shaft 350 and may be inserted into the throttle valve housing 300 substantially perpendicular to the bore 310. The throttle valve plug 360 may be made, for example, of anodized aluminum, bead-blasted titanium or a ceramic material such as aluminum oxide ($Al_2O_3$) or aluminum nitride (AlN) or the like. Preferably, the throttle valve plug 360 may be made, for example, to include preferred materials such as 316 or 304 stainless steel.

The throttle valve plug assembly 320 may be attached to the side of the throttle valve housing 300 using screw 325, lock washer 335 and flat washer 345, for example, as shown in FIG. 3. The throttle valve housing 300 may be attached to a throttle valve flange 355 using a lower attachment assembly 365 and screws 400 (FIG. 4), for example. The attachment assembly 365 may include an O-ring 375, a hollow seal 380, generally cylindrical in shape with convex portions or protrusions 385 for sealably engaging the concave cut-out portion 370 of the throttle valve plug 360, and an O-ring 390.

The O-ring 375 may be installed between the throttle valve housing 300 and the throttle valve flange 355 and the O-ring 390 may be installed between the hollow seal 380 and the throttle valve flange 355.

An upper attachment assembly 366 may attach the top surface 395 of throttle valve housing 300 to exhaust pipe 131 (FIGS. 1 and 2), coupling an upper end of bore 310 to exhaust pipe 131. The attachment assembly 366 may include an O-ring 376, a hollow seal 381, generally cylindrical in shape with convex portions or protrusions 386 for sealably engaging the concave cut-out portion 370 of the throttle valve plug 360, and an O-ring 391. The O-ring 376 may be installed between the throttle valve housing 300 and a flange portion (not shown) at an end of exhaust pipe 131 and the O-ring 391 may be installed between the hollow seal 381 and the flange portion (not shown) at the end of exhaust pipe 131.

Figure 4:
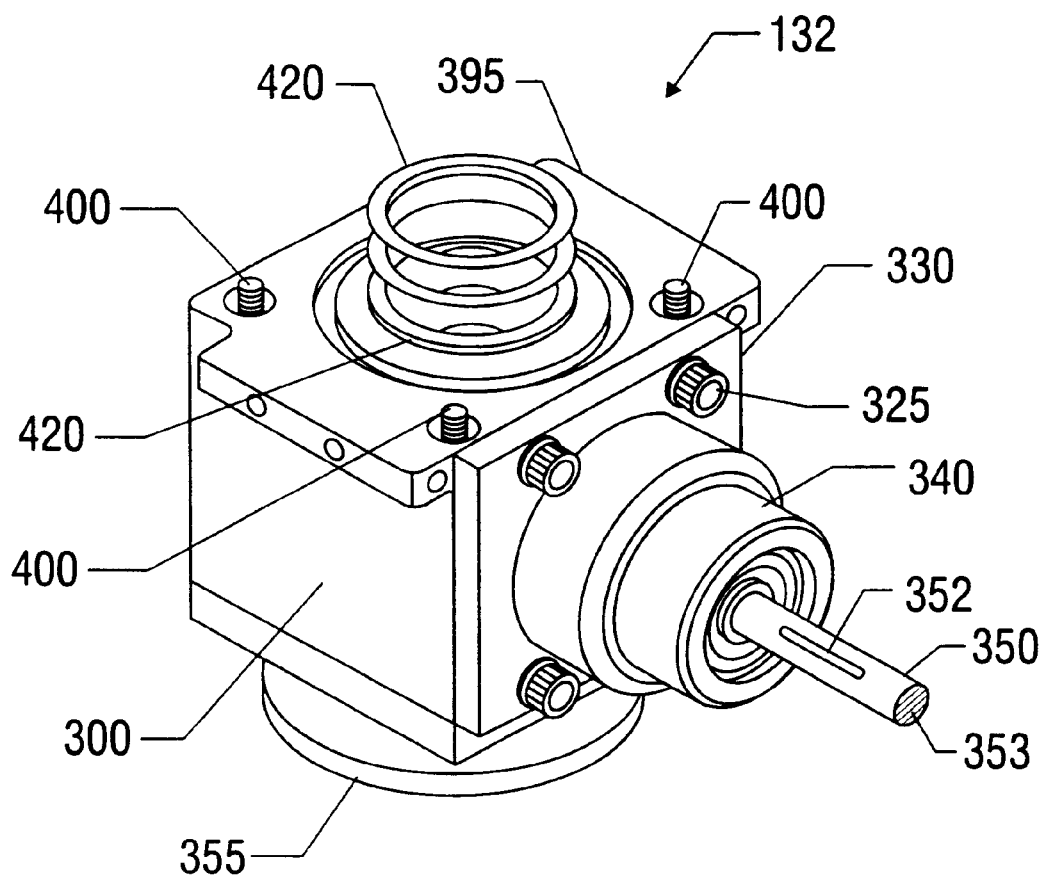
FIG. 4 is a perspective view of the embodiment shown in FIG. 3 assembled.

Turning now to FIG. 4, showing an assembled perspective view of the throttle valve 132 embodiment shown in FIG. 3, spring 420 is shown. Spring 420 may be included in the upper attachment assembly 366. Spring 420 may bias the hollow seal 381 against the throttle valve plug 360 to assist in sealably engaging the convex portions 386 of the hollow seal 381 with the concave cut-out portion 370 of the throttle valve plug 360 when the throttle valve plug 360 is in a closed position, for example, with the concave cut-out portion 370 facing away from the throttle valve flange 355, as shown in FIG. 3. A corresponding spring (not shown) may be included in the lower attachment assembly 365. Such a corresponding spring may bias the hollow seal 380 against the throttle valve plug 360 to assist in sealably engaging the convex portions 385 of the hollow seal 380 with the concave cut-out portion 370 of the throttle valve plug 360 when the throttle valve plug 360 is in another closed position, for example, with the concave cut-out portion 370 facing toward the throttle valve flange 355.

Figure 5A:
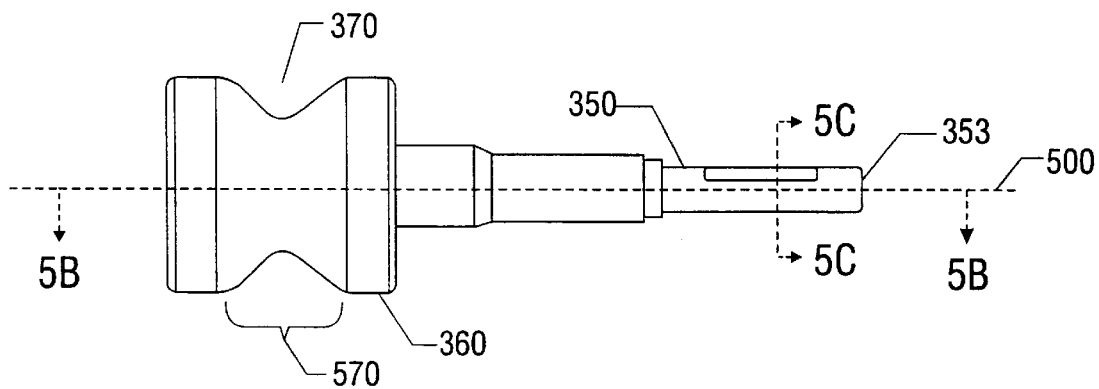
FIGS. 5A–5C are cross-sectional views of a throttle valve plug and shaft according to the embodiment shown in FIG. 3.
Figure 5B:
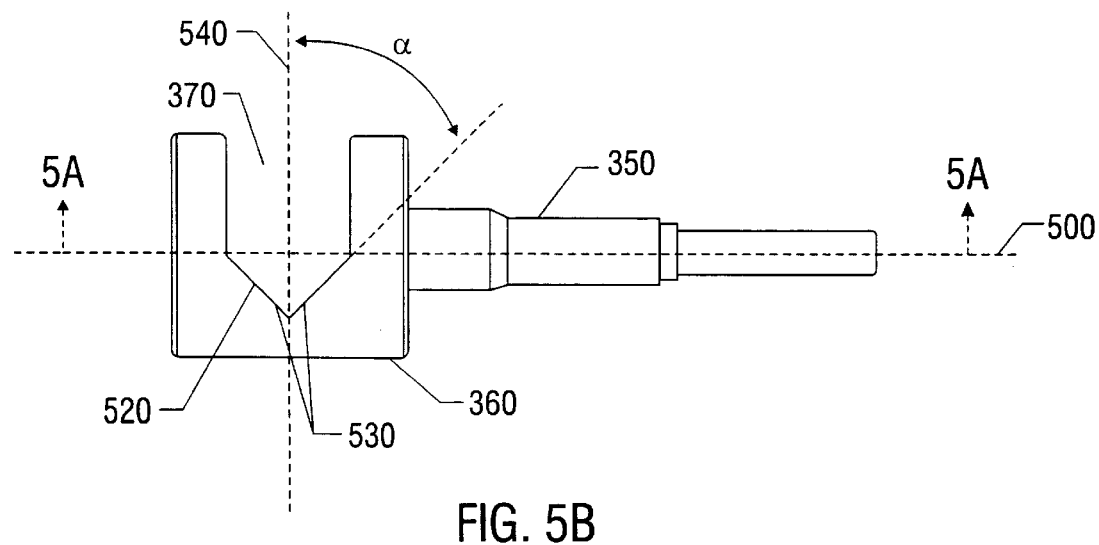
Figure 5C:
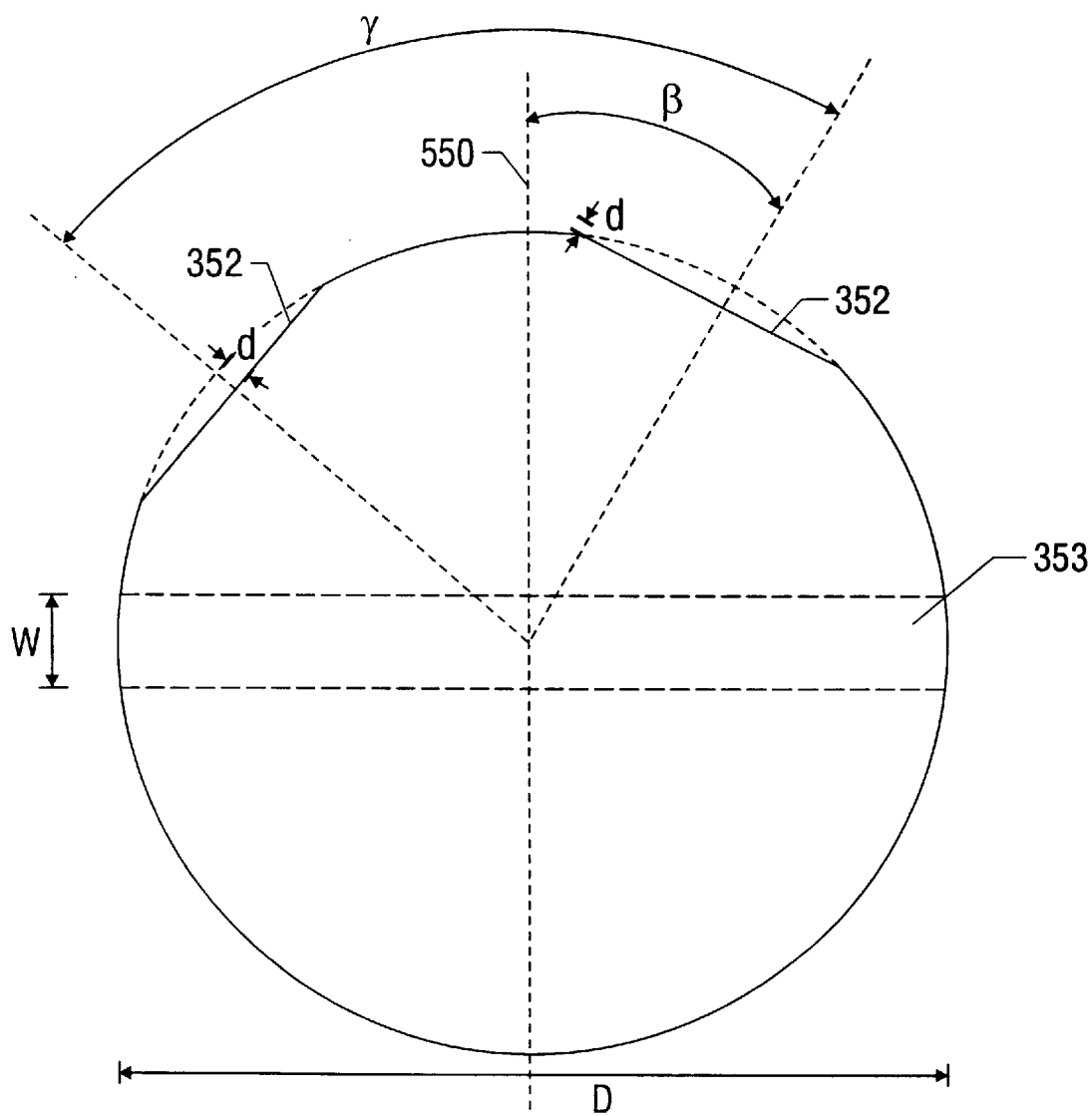

Turning now to FIGS. 5A–5C, cross-sectional views of the throttle valve plug 360 with the concave cut-out portion 370 and shaft 350 are shown. FIG. 5A shows a cross-sectional view made by a plane passing through a symmetry axis 500 of the shaft 350 parallel to the plane defined by the top surface 395 of the throttle valve housing 300 when the throttle valve plug 360 is in the closed position shown in FIG. 3, with the concave cut-out portion 370 facing away from the throttle valve flange 355, as indicated also by the line VA—VA in FIG. 5B. The cross-sectional view of the throttle valve plug 360 and the concave cut-out portion 370 shown in FIG. 5A has a substantially hourglass-shaped portion 510.

FIG. 5B shows a cross-sectional view made by a plane passing through the symmetry axis 500 of the shaft 350 substantially perpendicular to the plane defined by the top surface 395 of the throttle valve housing 300 when the throttle valve plug 360 is in the closed position shown in FIG. 3, with the concave cut-out portion 370 facing away from the throttle valve flange 355, as indicated also by the line VB—VB in FIG. 5A. The cross-sectional view of the throttle valve plug 360 and the concave cut-out portion 370 shown in FIG. 5B has a substantially V-shaped portion 520. The edges 530 of the V-shaped portion 520 form an angle $\alpha$ with a line 540 substantially perpendicular to the symmetry axis 500 of the shaft 350, as shown in FIG. 5B. The angle $\alpha$ may be 45°, for example. The throttle valve plug 360 may be about 1.4 inches (3.6 cm) long, measured along the symmetry axis 500 of the shaft 350, and have a diameter of about 1.37 inches (3.5 cm). The concave cut-out portion 370 may be about 0.8 inches (2.1 cm) long, again measured along the symmetry axis 500 of the shaft 350.

FIG. 5C shows a cross-sectional view of the shaft 350, as indicated by the line VC—VC in FIG. 5A. Two flat portions 352 are shown in FIG. 5C, one flat portion 352 having a perpendicular bisector making an angle β with the line 550 substantially perpendicular to both the line 540 shown in FIG. 5B and the symmetry axis 500 of the shaft 350. The other flat portion 352 shown in FIG. 5C has a perpendicular bisector making an angle (γ-β) with the line 550, and making an angle γ with the perpendicular bisector making an angle β with the line 550. The position and orientation of the slot 353 is indicated in phantom, as shown in FIG. 5C. The two flat portions 352 along the shaft 350, and the slot 353 at the end of the shaft 350, may enable the tools that turn and position the shaft 350 to engage the shaft 350 more securely. The width W of the slot 353 may be about 0.06 inches (0.15 cm), for example. The diameter D of the portion of the shaft 350 shown in FIG. 5C may be about 0.25 inches (0.6 cm), for example. The distance d from the flat portions 352 along the perpendicular bisectors to the circumference of the shaft 350 (shown in phantom in FIG. 5C) may be about 0.02 inches (0.05 cm), for example. The angle β with the line 550 may be about 30°, for example, and the angle γ may be about 90°, for example.

Figure 6A:
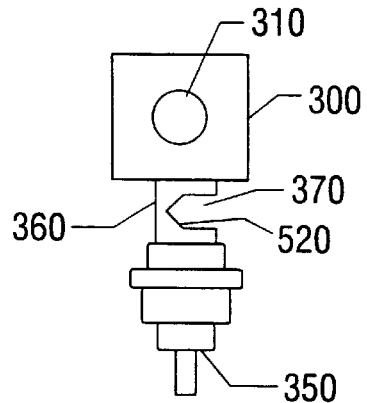
FIGS. 6A–6C are cross-sectional views of an exploded throttle valve housing, bore, a throttle valve plug and shaft according to the embodiment shown in FIG. 3.
Figure 6B:
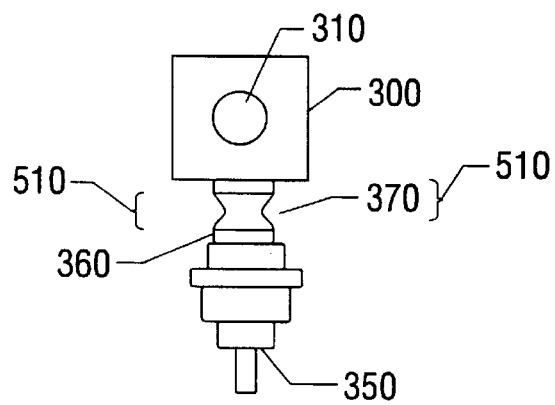
Figure 6C:
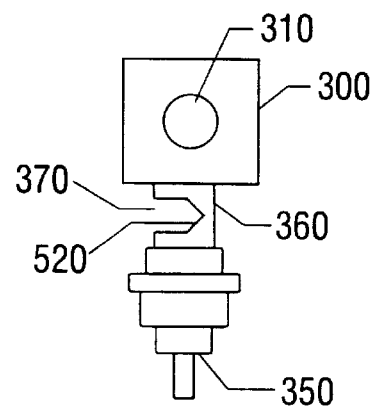

Turning now to FIGS. 6A–6C, cross-sectional views of an exploded throttle valve housing 300, bore 310, throttle valve plug 360 and shaft 350 are shown. The throttle valve plug 360 and shaft 350 are shown withdrawn from the throttle valve housing 300 and bore 310 for the purpose of illustration. FIG. 6A shows the throttle valve plug 360 in a first fully open position. In such a fully open position, when the throttle valve plug 360 and shaft 350 are fully inserted into the throttle valve housing 300 and bore 310, the concave cut-out portion 370 may not obstruct or restrict the flow of gases passing from the vacuum chamber 150 (FIG. 1) through the exhaust pipe 131 (FIGS. 1 and 2). In the first fully open position as shown in FIG. 6A, the flow of such gases, which may include exhausted process gases and/or cleaning gases, may be the least restricted. In the first fully open position as shown in FIG. 6A, when cleaning gases are exhausted through exhaust pipe 131 and through the bore 310, the concave cut-out portion 370 of the throttle valve plug 360 may allow the cleaning gases access to the right side of the bore 310, cleaning the right side of the bore 310 of deposition materials that may have been deposited thereon by process gases from the vacuum chamber 150 in the exhaust pipe 131.

FIG. 6B shows the throttle valve plug 360 in a fully closed position. In such a fully closed position, when the throttle valve plug 360 and shaft 350 are fully inserted into the throttle valve housing 300 and bore 310, the concave cut-out portion 370 may obstruct or restrict the flow of gases passing from the vacuum chamber 150 (FIG. 1) through the exhaust pipe 131 (FIGS. 1 and 2). In the fully closed position as shown in FIG. 6B, the flow of such gases, which may include exhausted process gases and/or cleaning gases, may be the most restricted. In the fully closed position as shown in FIG. 6B, when cleaning gases from the vacuum chamber 150 are in the exhaust pipe 131 and in the bore 310, the concave cut-out portion 370 of the throttle valve plug 360 may allow the cleaning gases access to upper portions of the right and left sides of the bore 310, cleaning the upper portions of the right and left sides of the bore 310 of deposition materials that may have been deposited thereon by process gases from the vacuum chamber 150 in the exhaust pipe 131.

FIG. 6C shows the throttle valve plug 360 in a second fully open position. In such a fully open position, as discussed above with respect to FIG. 6A, when the throttle valve plug 360 and shaft 350 are fully inserted into the throttle valve housing 300 and bore 310, the concave cut-out portion 370 may again not obstruct or restrict the flow of gases passing from the vacuum chamber 150 (FIG. 1) through the exhaust pipe 131 (FIGS. 1 and 2). In the second fully open position as shown in FIG. 6C, the flow of such gases, which may include exhausted process gases and/or cleaning gases, may again be the least restricted. In the second fully open position as shown in FIG. 6C, when cleaning gases are exhausted through exhaust pipe 131 and through the bore 310, the concave cut-out portion 370 of the throttle valve plug 360 may allow the cleaning gases access to the left side of the bore 310, cleaning the left side of the bore 310 of deposition materials that may have been deposited thereon by process gases from the vacuum chamber 150 in the exhaust pipe 131.

The shaft 350 may be turned by a motor (not shown), under the control of the processor 134 (FIG. 1) as instructed by computer instructions stored in the memory 138 (FIG. 1), to turn the throttle valve plug 360 to positions intermediate the first and second fully open positions shown in FIGS. 6A and 6C to regulate and control the flow of gases through the exhaust pipe 131 and the bore 310, and the pressure of the gases in the vacuum chamber 150. The shaft 350 in the first and second fully open positions, as shown in FIGS. 6A and 6C, is rotated by substantially 90° from the shaft 350 in the fully closed position, as shown in FIG. 6B.

Using such a throttle valve 132, as in the embodiments shown in FIGS. 3–6, may speed up the cleaning process and extend the production processing time available between successive cleanings. For example, such a throttle valve 132 may only become clogged up with deposition materials after about 10,000 or more wafers have been processed, whereas a conventional throttle valve typically becomes clogged up with deposition materials after only about 200 or fewer wafers have been processed.

The deposition process performed in CVD system 100 (FIG. 1) can be either a thermal process or a plasma enhanced process. In a plasma process, a controlled plasma is formed adjacent to the wafer by RF energy applied to inlet manifold 110 from RF (or microwave) power supply 125. Inlet manifold 110 is also an RF electrode, while susceptor 120 is grounded. RF (or microwave) power supply 125 can supply either single or mixed frequency RF power to manifold 110 to enhance the decomposition of reactive species introduced into chamber 150. Alternatively, and/or additionally, the RF (or microwave) power supply 125 may be used to supply microwave energy into the CVD system 100 during a cleaning step when a thermal deposition process is performed in the CVD system 100.

A motor, not shown, may raise and lower susceptor 120 between processing position 140 and a lower, wafer-loading position. The motor, gas supply valves connected to gas lines 180, throttle valve 132 and RF (or microwave) power supply 125 may be controlled by a processor 134 over control lines 136 of which only some are shown. Processor 134 may operate under the control of a computer program stored in a memory 138. The computer program may dictate the timing, mixture of gases, chamber 150 pressure, chamber 150 temperature, RF power levels, susceptor 120 position, and other parameters of a particular process.

The above CVD system description is mainly for illustrative purposes and should not be considered as limiting the scope of the present invention. Variations of the above-described system, such as variations in platen and/or susceptor design, heater design, location of RF and/or microwave power connections, if any, and others are possible. Additionally, other CVD equipment such as other SACVD devices, inductively coupled plasma CVD devices, electron cyclotron resonance (ECR) plasma CVD devices or the like may be employed.

A selected pressure of between about 100–700 torr in the reaction chamber 150 may be set and maintained throughout deposition by throttle valve 132, in conjunction with the vacuum pump system and the introduction of the process gas.

What is claimed is:

1. A throttle valve assembly comprising:
   a throttle valve housing having a bore therethrough; and
   a throttle valve plug assembly including a shaft rotatably mounted on said throttle valve housing and a substantially cylindrically-shaped throttle valve plug having a concave cut-out portion, said throttle valve plug mounted on said shaft within said throttle valve housing and substantially perpendicular to said bore, said throttle valve plug having at least two fully open positions and a closed position, said concave cut-out portion having a first cross-section with a V-shaped portion formed by a first plane passing through a longitudinal axis of said shaft and a second cross-section with an hourglass-shaped portion formed by a second plane that passes through said longitudinal axis and is perpendicular to said first plane.

2. The throttle valve assembly of claim 1, wherein said bore is substantially cylindrical.

3. The throttle valve assembly of claim 1, wherein said shaft has at least one substantially flat portion disposed thereon.

4. The throttle valve assembly of claim 3, wherein said shaft has a slot disposed in an end opposite said throttle valve plug.

5. The throttle valve assembly of claim 1, wherein said throttle valve plug in said closed position is rotated by substantially 90° from said throttle valve plug in one of said at least two fully open positions.

6. The throttle valve assembly of claim 5, wherein said concave cut-out portion of said throttle valve plug in said closed position faces an end of said bore.

7. A chemical vapor deposition reactor system comprising:
   a housing for forming a vacuum chamber;
   a substrate holder, located within said housing, for holding a substrate;
   a gas distributor for introducing a process gas into said vacuum chamber to deposit a layer over said substrate;
   a gas mixing area, coupled to said gas distributor, in which a plurality of gases intermingle to form said process gas;
   a gas distribution system, coupled to said gas mixing area, for introducing said plurality of gases into said gas mixing area;
   a heater for heating said substrate;
   a vacuum system for pressurizing said vacuum chamber;
   a throttle valve assembly including:
      a throttle valve housing having a bore therethrough; and
      a throttle valve plug assembly including a shaft rotatably mounted on said throttle valve housing and a throttle valve plug having a concave cut-out portion, said throttle valve plug mounted on said shaft within said throttle valve housing and substantially perpendicular to said bore, said throttle valve plug having at least two fully open positions and a closed position, said concave cut-out portion having a first cross-section with a V-shaped portion defined by a first plane passing through a longitudinal axis of said shaft;
   a controller for controlling said gas distribution system, said heater, said vacuum system and said throttle valve assembly; and
   a memory, coupled to said controller, including a computer-readable medium having a computer-readable program embodied therein for directing operation of said chemical vapor deposition reactor system, said computer-readable program including a set of computer instructions for controlling said throttle valve assembly.

* * * * *